United States Patent
Hedayat et al.

(10) Patent No.: US 10,285,203 B2
(45) Date of Patent: May 7, 2019

(54) NETWORK ALLOCATION VECTOR TYPES AND TRANSMISSION OPPORTUNITY TYPES FOR SPATIAL REUSE

(71) Applicant: NEWRACOM, INC., Irvine, CA (US)

(72) Inventors: Ahmad Reza Hedayat, Aliso Viejo, CA (US); Amin Jafarian, Princeton, NJ (US)

(73) Assignee: Newracom, Inc., Lake Forest, CA (US)

( * ) Notice: Subject to any disclaimer, the term of this patent is extended or adjusted under 35 U.S.C. 154(b) by 127 days.

(21) Appl. No.: 15/249,327

(22) Filed: Aug. 26, 2016

(65) Prior Publication Data

US 2017/0064739 A1    Mar. 2, 2017

Related U.S. Application Data

(60) Provisional application No. 62/254,131, filed on Nov. 11, 2015, provisional application No. 62/216,274, (Continued)

(51) Int. Cl.
| | | |
|---|---|---|
| *H04W 74/08* | (2009.01) | |
| *H04L 5/00* | (2006.01) | |
| *H04W 84/12* | (2009.01) | |

(52) U.S. Cl.
CPC ....... *H04W 74/0816* (2013.01); *H04L 5/0025* (2013.01); *H04L 5/0037* (2013.01); *H04L 5/0091* (2013.01); *H04W 84/12* (2013.01)

(58) Field of Classification Search
CPC .............. H04W 84/12; H04W 74/0816; H04L 5/0025; H04L 5/0037; H04L 5/0091
See application file for complete search history.

(56) References Cited

U.S. PATENT DOCUMENTS

| 2003/0123405 A1* | 7/2003 | del Prado ............. H04W 16/14 370/331 |
| 2007/0037548 A1* | 2/2007 | Sammour ......... H04W 52/0235 455/343.2 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Jianye Wu
(74) *Attorney, Agent, or Firm* — Morgan, Lewis & Bockius LLP

(57) ABSTRACT

In an example of wireless communications, a transmitting station may set multiple network allocation vectors (NAVs) to reserve a communication medium for transmitting a frame in the amount of time indicated by the NAVs. A receiving station that receives a frame may identify which NAV is intended to be set by the receiving station. The receiving station may update a first type of NAV with duration information from the frame when the frame is received from a same wireless network, and update a second type of NAV with duration information from the frame when the frame is received from a different wireless network. The receiving station may ignore setting the NAV when the frame is received from the different wireless network. Alternatively, the receiving station may not ignore setting the NAV when the frame is received from the same wireless network. Other methods, apparatus, and computer-readable media are also disclosed.

20 Claims, 10 Drawing Sheets

Related U.S. Application Data filed on Sep. 9, 2015, provisional application No. 62/210,420, filed on Aug. 26, 2015.

(56) References Cited

U.S. PATENT DOCUMENTS

| | | | |
|---|---|---|---|
| 2010/0074198 A1* | 3/2010 | Morioka | H04L 12/413 370/329 |
| 2015/0063251 A1* | 3/2015 | Asterjadhi | H04W 74/04 370/329 |
| 2016/0192397 A1* | 6/2016 | Kim | H04W 74/0816 370/336 |
| 2017/0041952 A1* | 2/2017 | Kim | H04W 74/08 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

NETWORK ALLOCATION VECTOR TYPES AND TRANSMISSION OPPORTUNITY TYPES FOR SPATIAL REUSE

CROSS-REFERENCE TO RELATED APPLICATIONS

This application claims the benefit of priority from U.S. Provisional Application No. 62/210,420, entitled "NAV TYPES," filed Aug. 26, 2015, U.S. Provisional Application No. 62/216,274, entitled "TXOP TYPES," filed Sep. 9, 2015, and U.S. Provisional Application No. 62/254,131, entitled "METHODS FOR SPATIAL REUSE WITH TXOP TYPES HANDLING," filed Nov. 11, 2015, the entirety of each of which is incorporated herein by reference.

TECHNICAL FIELD

The present description relates in general to wireless communication systems and methods, and more particularly to, for example, without limitation, network allocation vector types and transmission opportunity types for spatial reuse.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

Figure 1:
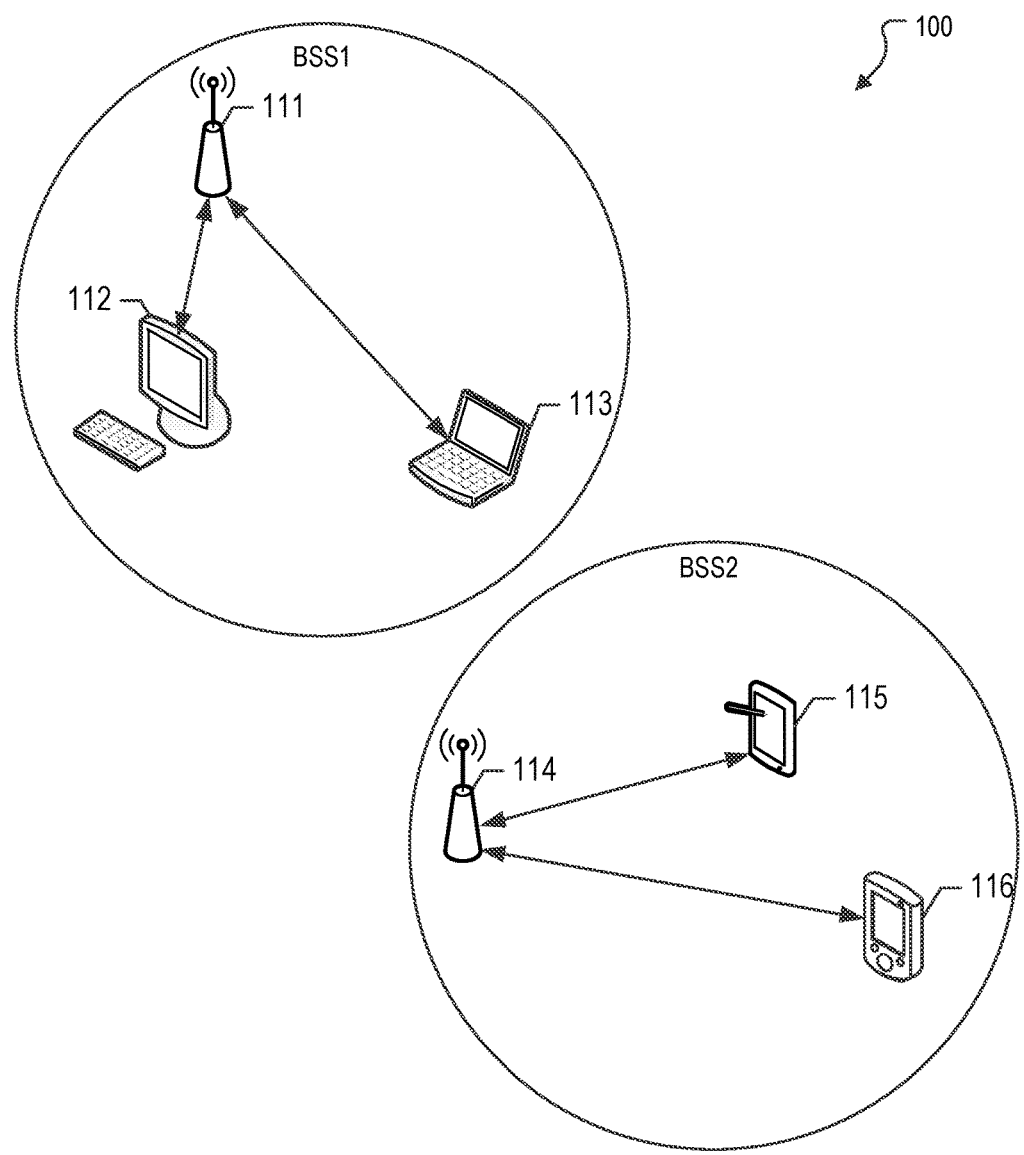
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Carrier sensing mechanisms provide new opportunities for next-generation WiFi technology. For example, network allocation vector (NAV) is a carrier sensing technique that can be used in WiFi technology in order to ensure medium reservation for stations to transmit frames critical to the operation of next generation WLAN technologies, including 802.11ax technology, over a transmission opportunity (TXOP) for spatial reuse. Due to this and other advantages, different types of NAVs and different types of TXOP techniques may be desirable for the 802.11ax technology, which is also referred to as high efficiency (HE) technology.

In carrier-sensing mechanisms for 802.11ax technology, stations may ignore a network allocation vector (NAV) in some situations. The stations that ignore an overlapping basic service set (OBSS) NAV, however, may not know the source of the NAV such as which station has set the current NAV and whether the current NAV can be ignored by that station. In one or more implementations of the present disclosure, stations can ignore the NAV in some scenarios; however, stations are not allowed to ignore the NAV set by stations in their own BSS. In this regard, the present disclosure addresses a new NAV (e.g., a non-ignorable NAV) that can be set under multiple conditions. For example, the "non-ignorable" NAV should not be ignored by a station of a basic service set (BSS) if the NAV is set by another station inside the same BSS, of which the station is a part.

A station may initiate a frame exchange sequence onto a communication medium for a maximum duration within an interval of time referred to as the TXOP. However, the TXOP is limited to one type among all stations in existing WLAN technologies, hence excluding other stations from acquiring another TXOP until the initiated TXOP ends.

The present disclosure provides different TXOP types. Specifically, a new TXOP type is provided to increase spatial-reuse of the communication medium among the stations. The new TXOP type is referred to as "BSS-TXOP" (in contrast to "TXOP" which refers to ALL-TXOP). In the BSS-TXOP, the OBSS STAs (e.g., stations in a different BSS(s) than the station that initiated the BSS-TXOP) need not respect the NAV that is established by other BSS-TXOPs, and may ignore the frame exchanges related to the BSS-TXOP in order to initiate their own BSS-TXOP transmission. In some embodiments, there are two NAVs that are set by stations based on the type of TXOP initiated: (1) a first NAV that takes into account only transmissions from a current BSS when the BSS-TXOP is initiated, such that the first NAV is ignorable for OBSS STAs ("I_NAV"), and (2) a second NAV that takes into account all transmissions irrespective of BSS when the ALL-TXOP is initiated, such that the second NAV is non-ignorable by any station ("U_NAV").

The BSS-TXOP is incentivized by a longer interval of time compared to the ALL-TXOP, but the BSS-TXOP sets the I_NAV for only BSS STAs (e.g., stations in the same BSS as the station that initiated the BSS-TXOP). This allows the OBSS STAs to keep transmitting when BSS-STAs initiate their own BSS-TXOP. In some aspects, a ALL-TXOP is shorter by all STAs are required to respect it and avoid overriding it, while a BSS-TXOP allows STAs that do not belong to the same BSS to ignore the BSS-TXOP and in return the duration of BSS-TXOP is allowed to be longer.

One advantage of the BSS-TXOP is that the station with the right to initiate a frame exchange sequence on the communication medium is allowed to decide between reserving a longer TXOP (such as the BSS-TXOP) or reserving the entire communication medium for itself only (such as the ALL-TXOP). Use of the BSS-TXOP enables an increase in medium reuse among BSSs.

Given the availability of BSS-TXOP and ALL-TXOP, the present disclosure also describes how an access point (AP) or a non-AP station establishes its choice of TXOP. The offered choices consider the fair and safe aspects of coexistence between multiple TXOP types in vicinity of each other.

FIG. 1 illustrates a schematic diagram of an example of a wireless communication network 100. In the wireless communication network 100, such as a wireless local area network (WLAN), a first basic service set (BSS1) includes a first plurality of wireless communication devices (e.g., WLAN devices 111-113) and a second BSS (BSS2) includes a second plurality of wireless communication devices (e.g., WLAN devices 114-116). In one aspect, a BSS refers to a set of STAs that can communicate in synchronization, rather than a concept indicating a particular area. In the example, the wireless communication network 100 includes wireless communication devices 111-116, which may be referred to as stations (STAs).

Each of the wireless communication devices 111-116 may include a media access control (MAC) layer and a physical (PHY) layer according to an IEEE 802.11 standard. In the example, at least one wireless communication device in each BSS (e.g., device 111, device 114) is an access point (AP). An AP may be referred to as an AP STA, an AP device, or a central station. The other wireless communication devices (e.g., devices 112, 113, 115 and 116) may be non-AP STAs. Alternatively, all of the wireless communication devices 111-116 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium (or communication medium), for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

Figure 2:
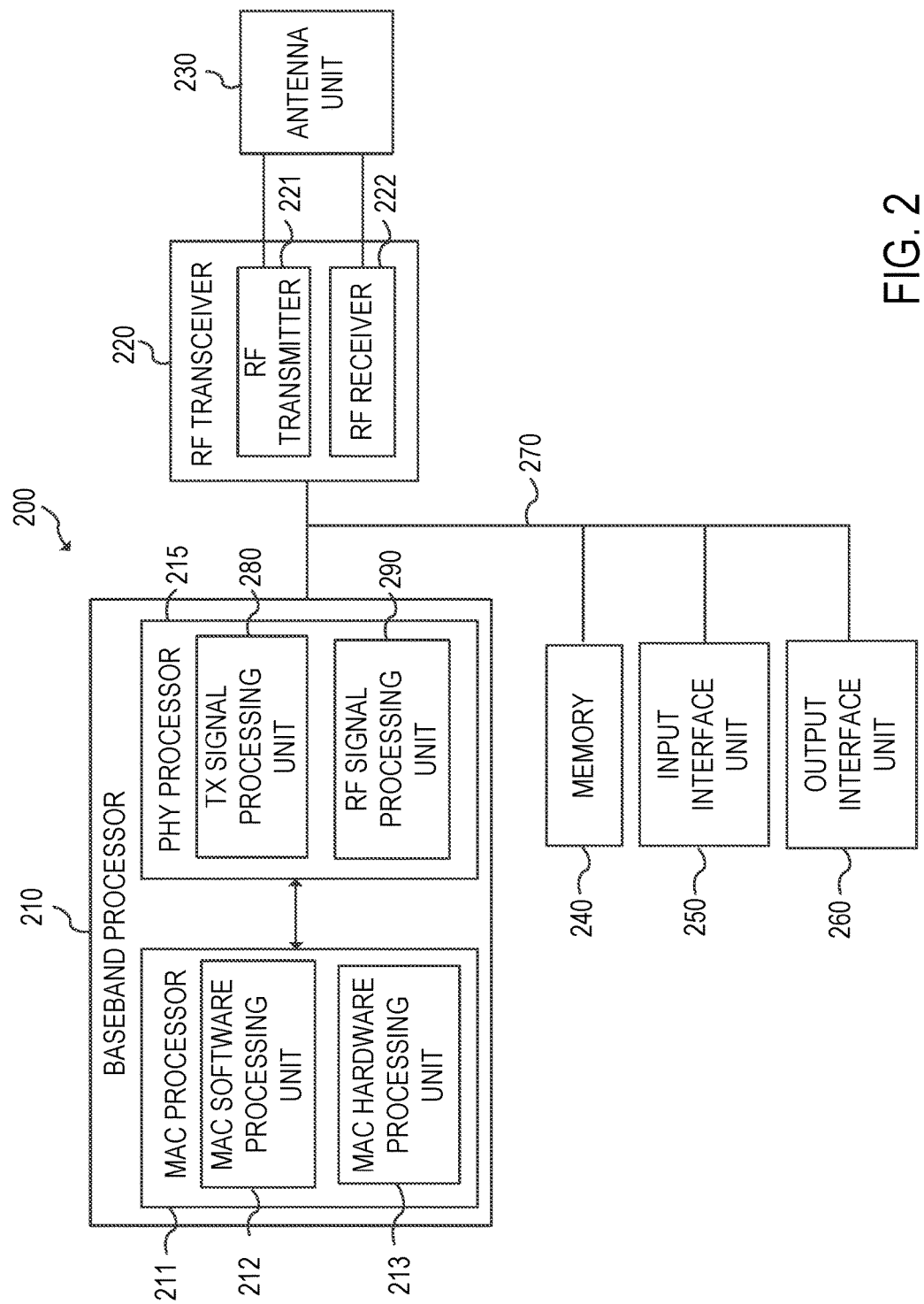
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
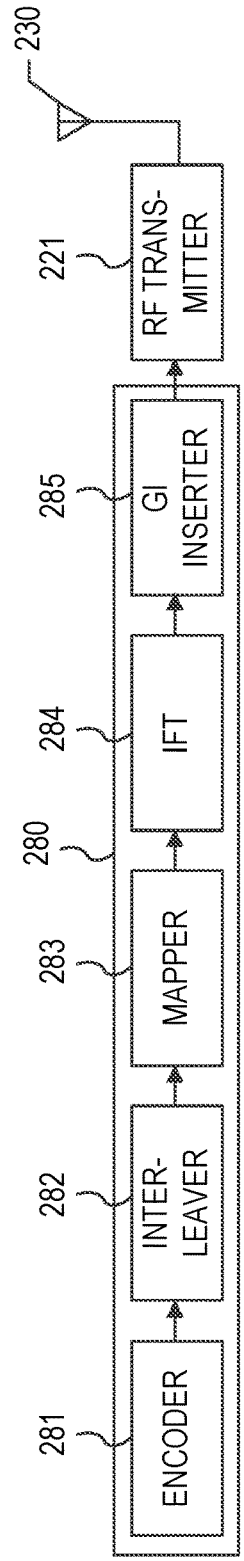
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
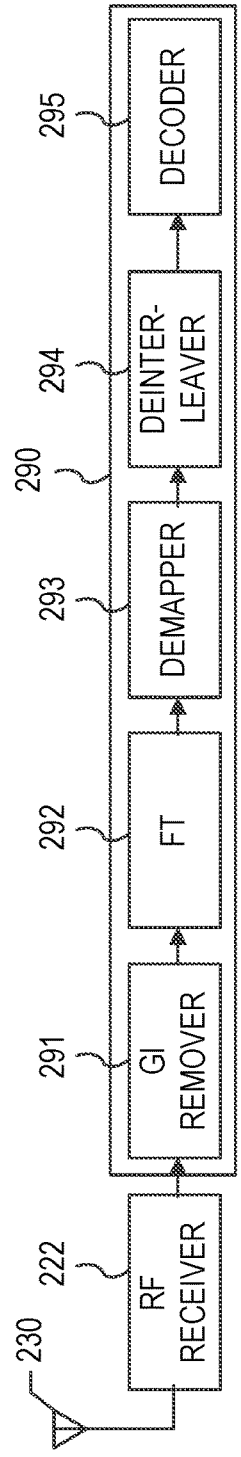
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
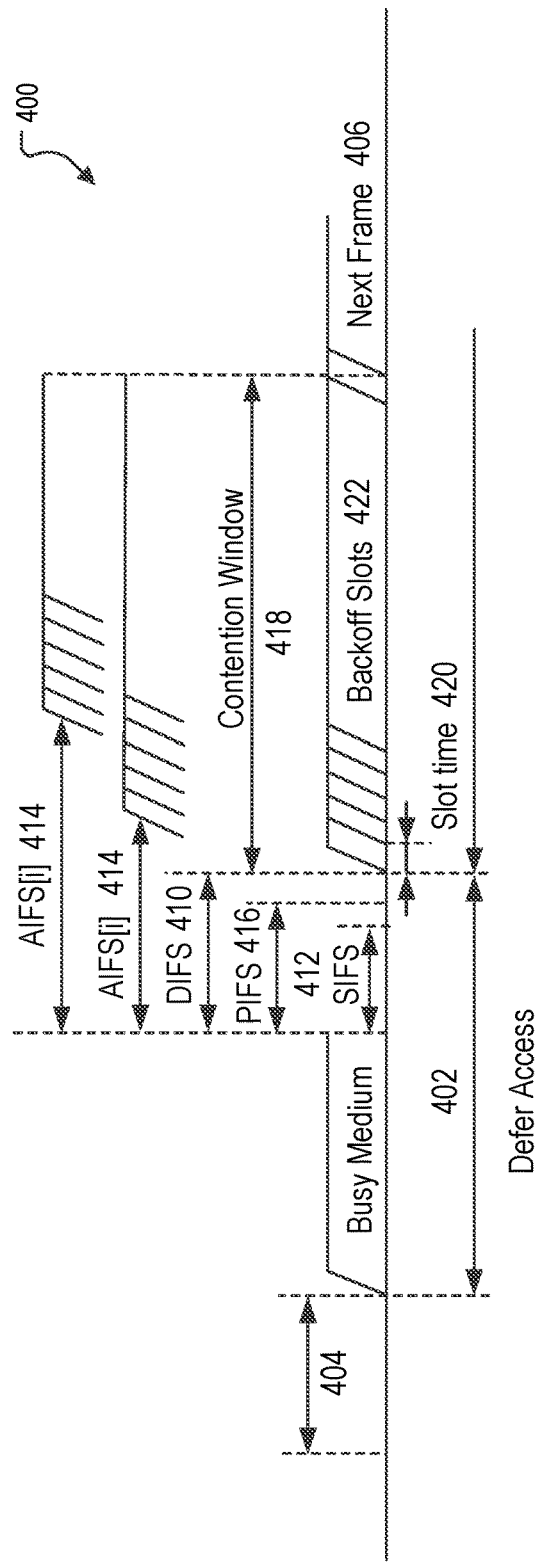
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
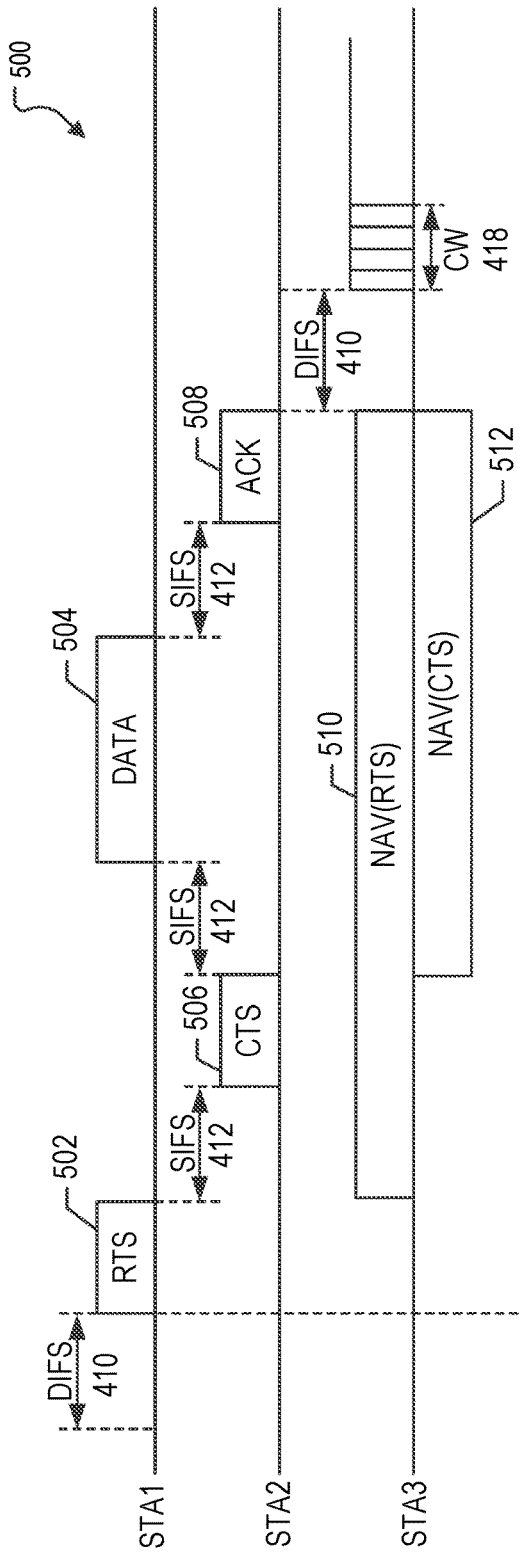
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from STA1 and/or a frame transmitted from STA2 can be received by STA3.

STA1 may determine whether the channel (or medium) is busy by carrier sensing. STA1 may determine the channel occupation based on an energy level on the channel or correlation of signals in the channel. In one or more implementations, STA1 determines the channel occupation by using a network allocation vector (NAV) timer. In one or more implementations, a NAV timer refers to the duration of the time remaining in a transmission opportunity (TXOP).

When determining that the channel is not used by other devices during the DIFS 410 (e.g., the channel is idle), STA1 may transmit an RTS frame 502 to STA2 after performing backoff. Upon receiving the RTS frame 502, STA2 may transmit a CTS frame 506 as a response of the CTS frame 506 after the SIFS 412.

When STA3 receives the RTS frame 502, STA3 may set a NAV timer for a transmission duration representing the propagation delay of subsequently transmitted frames by using duration information involved with the transmission of the RTS frame 502 (e.g., NAV(RTS) 510). For example, STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, STA3 may update the NAV timer by using duration information included in the new frame. STA3 does not attempt to access the channel until the NAV timer expires (e.g., when the NAV timer reaches zero).

When STA1 receives the CTS frame 506 from STA2, STA1 may transmit the data frame 504 to STA2 after the SIFS 412 elapses from a time when the CTS frame 506 has been completely received. Upon successfully receiving the data frame 504, STA2 may transmit the ACK frame 508 after the SIFS 412 elapses as an acknowledgment of receiving the data frame 504.

When the NAV timer expires, STA3 may determine whether the channel is busy by the carrier sensing. Upon determining that the channel is not used by the other WLAN devices (e.g., STA1, STA2) during the DIFS 410 after the NAV timer has expired, STA3 may attempt the channel access after a contention window 418 has elapsed. In this example, the contention window 418 may be based on a random backoff.

Figure 6:
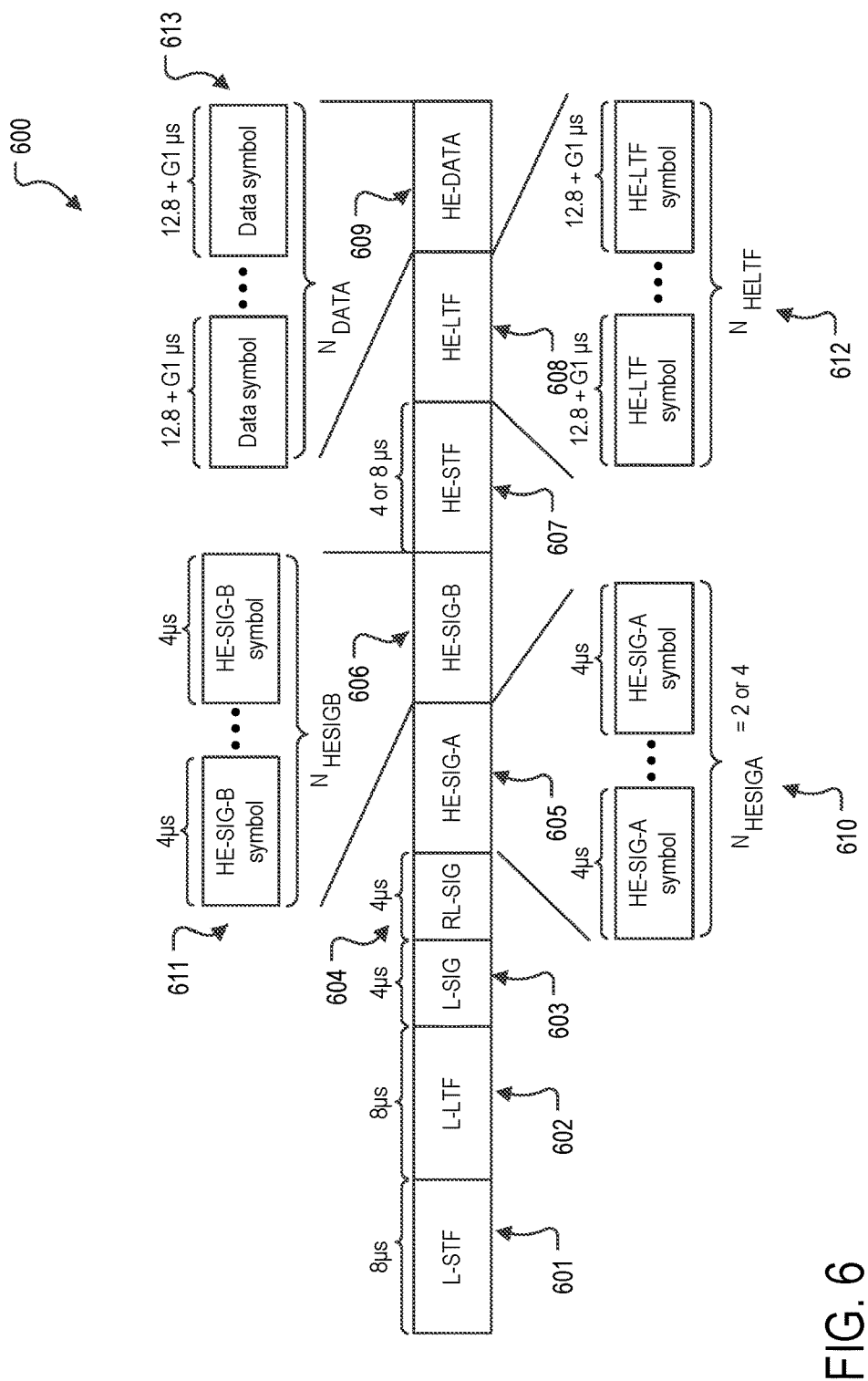
FIG. 6 illustrates a schematic diagram of an example of a format of a high efficiency (HE) physical layer convergence procedure (PLCP) protocol data unit (HE PPDU) frame.

FIG. 6 illustrates a schematic diagram of an example of a format of a high efficiency (HE) physical layer convergence procedure (PLCP) protocol data unit (HE PPDU) frame 600. A transmitting STA generates the PPDU frame 600 and transmits the PPDU frame 600 to a receiving STA. The receiving STA receives, detects, and processes the PPDU frame 600. The PPDU frame 600 includes an L-STF field 601, an L-LTF field 602, an L-SIG field 603, an RL-SIG field 604, an HE-SIG-A field 605, an HE-SIG-B field 606, an HE-STF field 607, an HE-LTF field 608, and an HE-DATA field 609. The HE-SIG-A field 605 includes $N_{HESIGA}$ symbols 610, the HE-SIG-B field 606 includes $N_{HESIGB}$ symbols 611, the HE-LTF field 608 includes $N_{HELTF}$ symbols 612, and the HE-DATA field 609 includes $N_{DATA}$ symbols 613. Table 1, shown below, describes fields of the PPDU frame 400 in more detail.

TABLE 1

| | | | | | | |
|---|---|---|---|---|---|---|
| | | PPDU Frame | | | | |
| Element | Definition | Duration | DFT period | GI | Subcarrier Spacing | Description |
| Legacy(L)-STF | Non-high throughput(HT) Short Training field | 8 µs | — | — | equivalent to 1,250 kHz | L-STF of a non-trigger-based PPDU has a periodicity of 0.8 µs with 10 periods. |
| L-LTF | Non-HT Long Training field | 8 µs | 3.2 µs | 1.6 µs | 312.5 kHz | |
| L-SIG | Non-HT SIGNAL field | 4 µs | 3.2 µs | 0.8 µs | 312.5 kHz | |
| RL-SIG | Repeated Non-HT SIGNAL field | 4 µs | 3.2 µs | 0.8 µs | 312.5 kHz | |
| HE-SIG-A | HE SIGNAL A field | $N_{HESIGA}$* 4 µs | 3.2 µs | 0.8 µs | 312.5 kHz | HE-SIG-A is duplicated on each 20 MHz segment after the legacy |

TABLE 1-continued

| | | | | | | |
|---|---|---|---|---|---|---|
| | | | | | | PPDU Frame |

| Element | Definition | Duration | DFT period | GI | Subcarrier Spacing | Description |
|---|---|---|---|---|---|---|
| | | | | | | preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$* 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}$* (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 μs excluding GI, and then removing the second half of |

TABLE 1-continued

PPDU Frame

| Element | Definition | Duration | DFT period | GI | Subcarrier Spacing | Description |
|---|---|---|---|---|---|---|
| HE-DATA | HE DATA field | $N_{DATA}$* (DFT period + GI) µs | 12.8 µs | supports 0.8, 1.6, 3.2 µs | 78.125 kHz | the OFDM symbol in time domain. $N_{HELTF}$ means the number of HE-LTF symbols and is equal to 1, 2, 4, 6, 8. $N_{DATA}$ means the number of HE data symbols. |

An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink using a frame format shown in this figure or a variation thereof (e.g., without any or some portions of an HE header).

Referring to FIG. 6, the HE frame 600 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 µs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STE field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64 on a 20 MHz basis. The HE-SIG-B field can be carried/modulated using an FTT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. An HE-SIG-B field is not always present in all frames. In some cases, single user (SU) packets and UL trigger-based packets do not contain the HE-SIG-B field. To facilitate decoding of the HE frame 600 by a receiver, the size of (e.g., number of symbols contained in) the HE-SIG-B field may be indicated in the HE-SIG-A field. In some aspects, the HE header also includes a repeated L-SIG (RL-SIG) field, whose content is the same as the L-SIG field.

For a 20 MHz channel, an FFT size of 64 is associated with a discrete Fourier transform (DFT) period of 3.2 µs and a subcarrier spacing of 312.5 kHz. For a 20 MHz channel, an FFT size of 256 is associated with a DFT period of 12.8 µs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The subcarrier spacing may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LFT field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload, PSDU, or Media Access Control (MAC) Protocol Data Units (MPDU) (e.g., MAC frame).

In one or more aspects, additional one or more HE-LTF fields may be included in the header. For example, an additional HE-LTF field may be located after a first HE-LTF field. The HE-LTF fields may be, for example, modulated/carried with FFT size of 64 on a 20 MHz channel and may be included as part of the first part of the HE frame 600. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Figure 7:
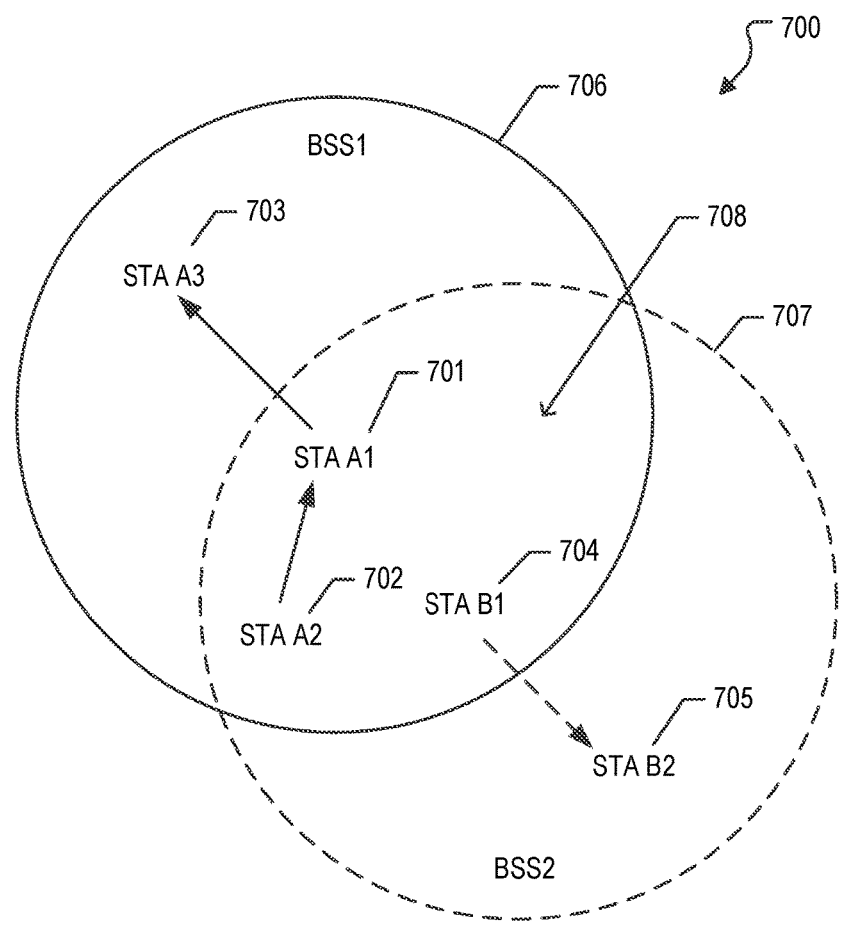
FIG. 7 illustrates a schematic diagram of an example of partially overlapping basic service sets.

FIG. 7 illustrates a schematic diagram 700 of an example of partially overlapping basic service sets. In FIG. 7, any one of the wireless communication devices 111-115 in FIG. 1 can be designated as one of STA A1, STA A2, STA A3, STA B1 or STA B2. In this example, the wireless communication device 111 is designated as STA A1, the wireless communication device 112 is designated as STA A2, the wireless communication device 113 is designated as STA A3, the wireless communication device 114 is designated as STA B1 and the wireless communication device 115 is designated as STA B2. The present disclosure, however, is not limited to this example. In the embodiment shown in FIG. 7, the stations are all within vicinity of each other such that each can hear (or receive) frame exchanges from the other stations.

The schematic diagram 700 illustrates the coverage of STA A1 of a first basic service set (BSS1) 706 and the coverage of STA B1 of a second basic service set (BSS2) 707. In FIG. 7, the term "BSS1" refers to "BSS" or "intra-BSS," and the term "BSS2" refers to "OBSS" or "inter-BSS."

The BSS1 706 includes a first station 701 (e.g., AP or STA A1), a second station 702 (e.g., STA A2), and a third station 703 (e.g., STA A3). The BSS2 707 includes a fourth station 704 STA B1) and a fifth station 705 (e.g., STA B2). In this regard, the first station 701, the second station 702 and the fourth station 704 are within the boundaries of both basic service sets at region 708. The first station 701 is transmitting a downlink frame to the third station 703, while the fourth station 704 is attempting to transmit a downlink frame to the fifth station 705. The second station 702 is transmitting an uplink frame to the first station 701.

In one or more implementations, a NAV is a carrier-sensing mechanism for enabling wireless stations listening on the medium (or channel) to indicate the amount of time required for transmission of one or more frames and to set their NAV, which is an indicator for a wireless station on how long it needs to defer from accessing the medium. When a frame is received/detected by a station (e.g., 701), and after determining the NAV within the received frame, the receiving station may conclude for how long the medium would be occupied.

Figure 8:
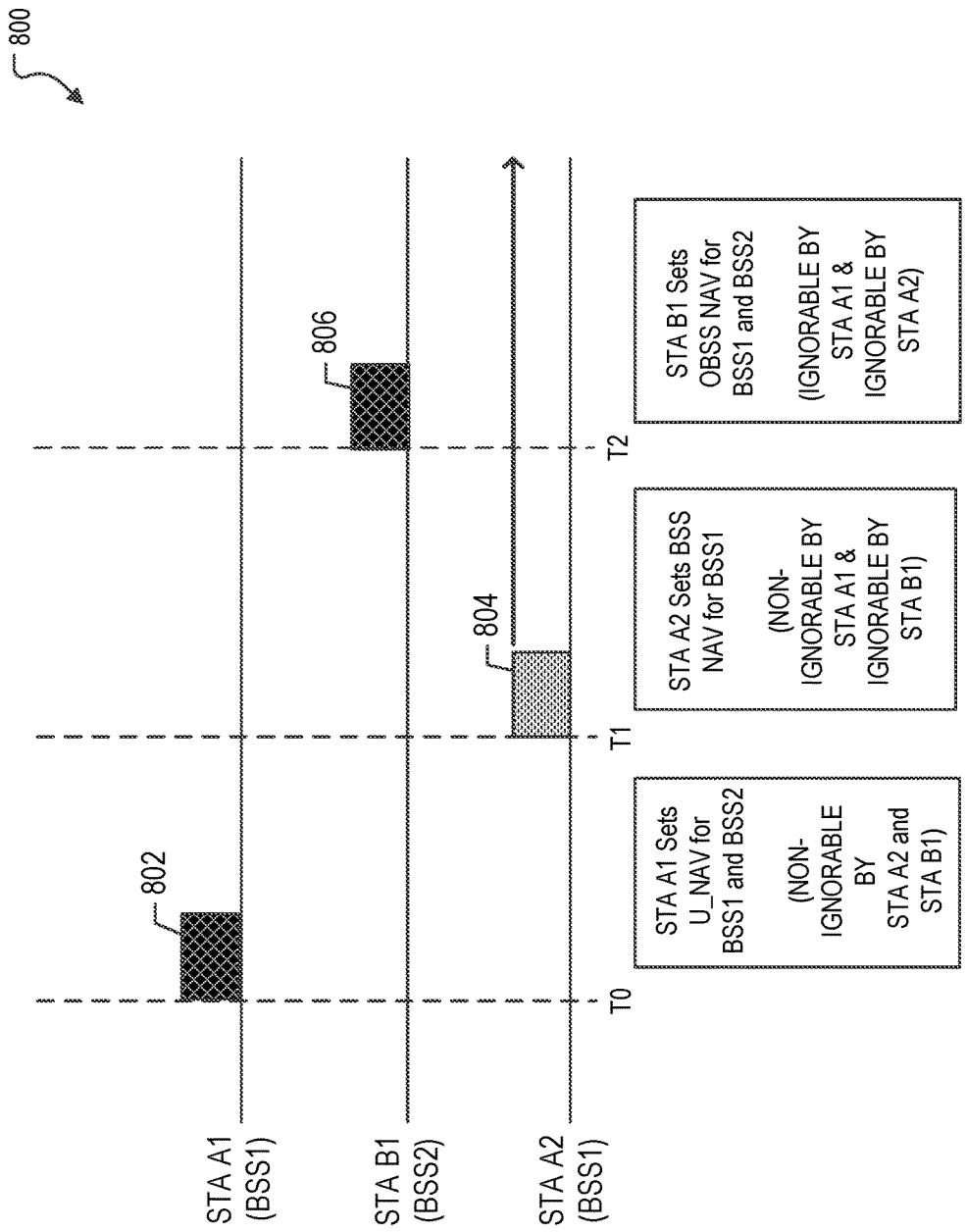
FIG. 8 illustrates a schematic diagram of an example of a transmission procedure including multiple types of network allocation vectors (NAVs).

FIG. 8 illustrates a schematic diagram of an example of a transmission procedure 800 including multiple types of network allocation vectors (NAVs). In FIG. 8, any one of the wireless communication devices 111-115 in FIG. 1 can be designated as one of STA A1, STA A2 or STA B1. In this example, the wireless communication device 111 is designated as STA A1 and the wireless communication device 112 is designated as STA A2. While the timing of the wireless communication devices 113, 114 and 115 is not shown in FIG. 8, the timing of the devices 113, 114 and 115 may be the same as that of STA B1. It should be noted that the present disclosure is not limited to the example described above.

In FIG. 8, the term "BSS1" refers to "BSS" or "intra-BSS," and the term "BSS2" refers to "OBSS" or "inter-BSS." As used herein, the term "BSS NAV" refers to a NAV that is set by a station of a same BSS as that of a station in receipt of the NAV. The term "BSS NAV" also refers to an "intra-BSS NAV." As used herein, the term "OBSS NAV" refers to a NAV that is set by a station of a different BSS than that of a station in receipt of the NAV. The term "OBSS NAV" also refers to an "inter-BSS NAV." In one or more implementations, a BSS NAV may be referred to as a non-ignorable NAV for BSS STAs and as an I_NAV for OBSS STAs. In one or more implementations, the non-ignorable NAV may be referred to as a U_NAV for all stations irrespective of BSS and I_NAV for BSS stations.

Stations ignoring the OBSS NAV, may or may not know which entity sets the current NAV, and if that can be ignored or not. The transmission procedure 800 includes a non-ignorable NAV (e.g., U_NAV for all stations, BSS NAV for BSS stations) that is set by a station under a set of predetermined conditions as a type of NAV. A main difference of that with the OBSS NAV is that it cannot be ignored. In some aspects, the OBSS NAV and the non-ignorable NAV correspond to different types of NAV.

In this example, STA A1 is a transmit WLAN device for transmitting data, STA A2 is a receive WLAN device for receiving the data, and STA B1 is a WLAN device that may be located at an area where a frame transmitted from STA A3 can be received by STA A2.

At time T0, STA A1 may transmit a frame 802 to STA A2. The STA A1 may set a U_NAV for BSS1 and BSS2 has to defer accordingly. STA A2 being part of BSS1 can respond to STA A1 during this NAV. When STA A2 receives the frame 802, STA A2 may not ignore the NAV set by STA A1.

In some aspects, STA A2 determines that the frame 802 is received in a PSDU of a PPDU frame (e.g., 600). STA A2 may determine that the PSDU identifies the received frame is associated with BSS1. In one or more implementations, STA A2 obtains the duration information from a duration field in the PSDU.

In one or more embodiments, STA A2 determines that the frame 802 includes header information in a PSDU of a PPDU frame (e.g., 600), in which the header information indicates that the frame 802 is associated with BSS1. In one or more implementations, STA A2 obtains the duration information from a transmission opportunity (TXOP) duration field in the header information. In this respect, the header information may include a HE SIG-A field (e.g., 605), in which the TXOP duration field is located in the HE SIG-A field.

At time T1, STA A2 transmits a frame 804 and sets a BSS NAV for BSS1 and BSS2. The NAV information set by STA A2 may be located within duration information of the frame 804. The BSS NAV may not be ignored by STA A1 since STA A1 is a station of the same BSS as STA A2. However, the BSS NAV can be ignored by STA B1 since STA B1 and STA A2 belong to different BSSs.

At time T2, STA B1 transmits a frame 806 and sets an OBSS NAV for BSS1 and BSS2. Upon receiving the frame 806 from STA B1 subsequent to the transmission of the frame 804, STA A2 ignores the NAV set by STA B1 since the NAV is determined to be an OBSS NAV. In this respect, STA A2 may continue contending on the medium so long as the NAV set by STA B1 is ignorable. In some aspects, STA A2 may reset the NAV set by STA B1 such that the NAV kept by STA A2 relates back to a value immediately before receipt of the NAV set by STA B1.

In one or more implementations, STA A2 identifies whether the frame 802 is associated with a first wireless network (e.g., BSS1) or a second wireless network (e.g., BSS2). STA A2 may update a first NAV (or a first type of NAV) with the duration information from the frame 802 when the frame 802 is associated with the first wireless network (e.g., BSS1). STA A2 may update a second NAV (or a second type of NAV) with the duration information from the frame 802 when the frame 802 is associated with the second wireless network (e.g., BSS2). In FIG. 8, STA A2 decides to respect the frame 802 such that STA A2 updates a second type of NAV (e.g., U_NAV) with a duration in the duration field of the frame 802. However, STA A2 is permitted to respond to the frame 802 since the frame 802 is identified as an inter-BSS frame.

The following is a listing of rules that may apply for the U_NAV:

Rule 1: A station may set both the U_NAV and the I_NAV for its BSS stations. In some cases, the station may set the U_NAV (e.g., set the non-ignorable NAV for only OBSS stations or set the non-ignorable NAV for a combination of BSS stations and OBSS stations). In some other cases, the station does not set the U_NAV even for BSS stations. In one or more implementations, the station can set both the U_NAV and the I_NAV concurrently within the station and depending on which NAV expires first, the STA decides what type of TXOP to initiate.

Rule 2: A station sets the I_NAV based on the frames received for OBSS stations only. In this respect, under some conditions, the OBSS stations are allowed to ignore the NAV set by a BSS station, and vice-versa. For example, a NAV set by STA B1 can be ignored by STA A2, which is located in a different BSS from that of STA B1. Conversely, a NAV set by STA A2 can be ignored by STA B1.

Rule 3: A station can have two individual counters, for example, one counter for each of the NAVs (e.g., I_NAV and U_NAV). The counters may be provided independently of one another by the station.

Rule 4: A station may ignore the I_NAV only when the U_NAV is not set. In this respect, the station may set both the I_NAV and U_NAV where the status of the I_NAV is superseded by the status of the U_NAV.

Rule 5: A station may not ignore the U_NAV or the BSS NAV for BSS stations. In some aspects, the U_NAV is intended to be processed by any station irrespective of whether the NAV is of a same BSS or of a different BSS than that of the station that set the NAV.

Rule 6: A station may distinguish between the two NAVs (e.g., U_NAV and I_NAV) by a flag (or indication). In this respect, the flag indicates whether the NAV can be ignored or not. In some aspects, the flag is a binary indication located within a MAC header of an MPDU in a payload of the frame. In other aspects, the flag is a non-binary indication carrying positive integer values to denote respective states (e.g., non-ignorable or ignorable) for respective NAVs set by the station. In some implementations, one of the timers provided by the station may be configured to only track time for a "current" NAV, where the current NAV tracks the value of the U_NAV or value of the I_NAV depending on the flag (or indication) within the frame.

Rule 7: A station that does not implement the U_NAV, defers to the current NAV. In this respect, the current NAV may be set to the value of the I_NAV.

The listing of rules above is not intended to be an exhaustive list and may include additional or less rules with respect to the setting and processing of a U_NAV for a station.

In some embodiments, when a station sets the NAV for a frame, the station also indicates what type of NAV is set for the frame. In the present disclosure, two high-level concepts apply: 1) different types of NAV are introduced where each of the different types of NAVS may be tracked in a different manner; and 2) the U_NAV being an example type among the different types of NAVs. In this framework, the U_NAV may be for example of a Type X0. A station that intends to ignore the NAV of Type X0 may not be a BSS station (i.e., an OBSS station can ignore the NAV).

For each of the constraint cases discussed below, a station may keep a NAV and a timer (or flags), and can ignore the NAV only if the corresponding NAV type permits the station to ignore the NAV.

In some embodiments, NAVs with different priorities may be set by a station such as a high priority NAV and a low priority NAV. In some aspects, a NAV marked high priority is not intended to be ignored by any station or wireless device in receipt of the NAV irrespective of whether the receiving station is identified as an OBSS station or BSS station. In other aspects, a NAV marked low priority is intended to be processed by only a BSS station in order for the BSS station to set their NAV timer with the received NAV and an OBSS station may ignore the NAV.

The concept of priorities may be applied to other types of NAVs. In this regard, a NAV identified as a certain type of NAV may need to have certain constraints (or conditions) satisfied associated with that identified type in order for a station in receipt of the NAV to be allowed to ignore the NAV. Otherwise, the NAV is non-ignorable.

In some embodiments, a NAV may be ignored by a station when the station is in receipt of higher priority data traffic (e.g., voice/videos data streams). In this respect, the NAV established by higher priority data traffic is determined to have greater priority level associated with the NAV.

In some embodiments, a NAV may be ignored by a station when the NAV necessitates a higher or lower CCA level in order to allow the station to contend with other stations on the medium depending on implementation. For example, if a NAV of type X1 is indicated, then the stations in receipt of the NAV may ignore the NAV only if the receiving station satisfies a CCA level of P1 (e.g., not to exceed a predetermined threshold corresponding to level P1).

In some embodiments, a NAV may be ignored by a station when the NAV necessitates a higher or lower interference power constraint depending on implementation. For example, a NAV of type X2 may be ignored by a station in receipt of the NAV only if the receiving station does not cause interference of more than P2 (e.g., not to exceed a predetermined threshold corresponding to level P2) at the station that set the NAV.

In some embodiments, a NAV may be ignored by a station when the NAV necessitates a higher or lower power constraint at the transmission depending on implementation. For example, a NAV of type X3 may be ignored by a station in receipt of the NAV only if the receiving station does not transmit with a transmission power level that exceeds P3 (e.g., exceed a predetermined threshold corresponding to level P3).

In some embodiments, a NAV may be ignored by a station when the NAV necessitates a combination of the above constraints depending on implementation. For example, a NAV of type X1X2 may be ignored by a station in receipt of the NAV only if the receiving station satisfies the CCA level constraint (e.g., not to exceed a predetermined threshold corresponding to level P1) and interference power constraint (e.g., not to exceed a predetermined threshold corresponding to level P2).

In some embodiments, a NAV may have an associated identifier (ID) and therefore the NAVs can be interconnected. For example, a station in receipt of a NAV associated with an assigned identifier (e.g., ID Y1) can ignore the NAV only if the station satisfies the constraint corresponding to the assigned identifier. In some aspects, each identifier may correspond to a different constraint for the NAV. In other aspects, a constraint for the NAV may apply to a range of identifiers.

There may be a set of rules defined based on what a station can do when multiple NAVs are set. The station may not disregard the rules for all of the NAVs that it is tracking. Some NAVs may be ignorable under some conditions, and those NAVS can be ignored only if the corresponding conditions are satisfied.

In some embodiments, the different NAV types may be prioritized based on whether the NAV is a U_NAV or an I_NAV. For example, the NAV having the most weight (e.g., a NAV that can be ignored by a negligible amount of stations or no existing group of stations in its CCA coverage) may be assigned with the highest priority, whereas the NAV having the least weight (e.g., a NAV that can be ignored by a relatively large group of stations in its CCA coverage) may be assigned with the lowest priority. In some aspects, the U_NAV has a higher priority than the I_NAV.

In some embodiments, a station that initiates a new NAV on top of other existing NAVs at the station may use a NAV having a lower priority compared to the existing NAVs. For example, the station may not initiate a U_NAV on top of an existing I_NAV at the station, however, the station can initiate an I_NAV on top of an existing U_NAV.

Figure 9:
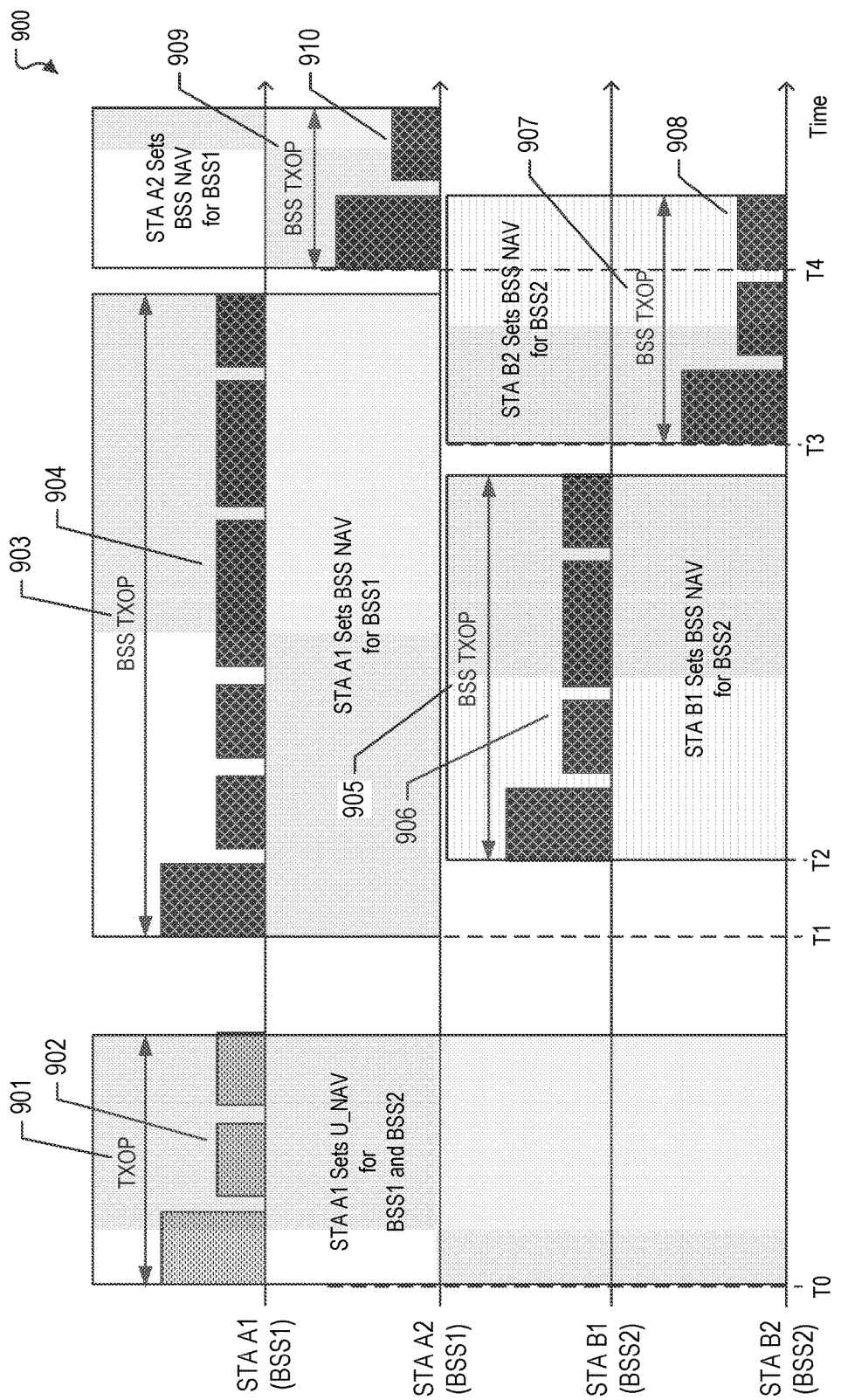
FIG. 9 illustrates a schematic diagram of an example of a transmission procedure including a NAV setting per a transmission opportunity (TXOP) type.

FIG. 9 illustrates a schematic diagram of an example of a transmission procedure involving a NAV setting per a TXOP type. In FIG. 9, any one of the wireless communication devices 111-115 in FIG. 1 can be designated as one of STA A1, STA A2 or as one of STA B1 or STA B2. In this example, the wireless communication device 111 is designated as STA A1, the wireless communication device 112 is designated as STA A2, the wireless communication device 114 is designated as STA B1 and the wireless communication device 115 is designated as STA B2. While the timing of the wireless communication devices 113 and 116 are not shown in FIG. 9, the timing of the device 113 may be the same as that of any one of STA A1 or STA A2 and the timing of the device 116 may be the same as that of any one of STA B1 or STA B2. It should be noted that the present disclosure is not limited to the example described above.

STA A1 initiates a frame exchange sequence onto a communication medium for a maximum duration within an interval of time referred to as TXOP 901. However, the TXOP 901 is limited to one type among all stations in existing WLAN technologies, hence excluding other stations from acquiring another TXOP until the initiated TXOP 901 ends.

In FIG. 9, different TXOP types are disclosed. Specifically, a new TXOP type (e.g., BSS TXOP 903) is provided to increase spatial-reuse of the communication medium among the stations. The new TXOP type is referred to as "BSS-TXOP" (in contrast to "TXOP" which refers to the ALL-TXOP). In the BSS-TXOP 903, the OBSS STAs (e.g., stations in a different BSS than the station that initiated the BSS-TXOP) need not respect the NAV that is established by other BSS-TXOPs, and may ignore the frame exchanges related to the BSS-TXOP 903 in order to initiate their own BSS-TXOP transmission (e.g., 906, 910).

The BSS-TXOP 903 sets the NAV for only BSS STAs (e.g., stations in the same BSS as the station that initiated the BSS-TXOP). In FIG. 9, the BSS TXOP 903 is set for BSS1, and therefore, applies to STA A1 and STA A2. This allows the OBSS STAs (e.g., STA B1, STA B2) to initiate a TXOP and start transmitting when BSS-STAs initiate their own BSS-TXOP. In some aspects, the ALL-TXOP may be shortened in length (e.g., along the time axis) to make the BSS-TXOP more meaningful to the BSS-STAs. The incentive is that the BSS stations can have access to the medium for a longer period of time using a less restrictive TXOP such as the BSS-TXOP, whereas stations requiring every receiving station in the vicinity to respect a more restrictive TXOP such as the ALL-TXOP would be limited to a shorter time period to maximize the spatial re-use over time as much as possible.

The advantage of the BSS-TXOP is that the station with the right to initiate a frame exchange sequence on the communication medium is allowed to decide between reserving a longer TXOP (such as the BSS-TXOP 903) or reserving the entire communication medium for itself only (such as the TXOP 901). Use of the BSS-TXOP enables an increase in medium reuse among BSSs.

Referring to FIG. 9, at time T0, STA A1 initiates a frame sequence 902 under a ALL-TXOP type (e.g., the TXOP 901). The frame sequence 902 may be exchanged with STA A2. In this respect, the other stations (e.g., STA B1 and STA B2) may be prevented from acquiring another TXOP until the initiated TXOP 901 ends. In some aspects, STA A1 sets a U_NAV and STAs from both BSS1 and BSS2 respect it. In some aspects, the NAV set by STA A1 may be ignorable by STA A2 in order to respond to a frame sent by STA A1 to STA A2. In some embodiments, the other stations (e.g., STA A2, STA B1, STA B2) may not initiate a new frame sequence under a BSS TXOP type during the transmission of the frame sequence 902.

At time T1, STA A1 initiates a frame sequence 904 under a BSS TXOP 903 following the end of the frame sequence 902. The STA A1 sets a NAV for BSS1. In this respect, the NAV may be referred to as a BSS NAV. In one or more implementations, the NAV is U_NAV for BSS1, i.e. STA A2 may not be permitted to ignore the BSS NAV. The BSS NAV may not be ignored by STA A2 because STA A2 is a station of the same BSS as STA A1. During this transmission, STA A2 is excluded from acquiring another TXOP until the initiated BSS TXOP 903 ends. In this embodiment, the other stations, such as STA B1 and STA B2, are not prevented of reusing the medium during the transmission of the frame sequence 904 at time T1 since the BSS TXOP 903 is applied to BSS1, not BSS2. However, STA B1 and STA B2, as a secondary TXOP initiator or a secondary user of the medium, may not initiate an ALL-TXOP since the ALL-TXOP is a more restrictive TXOP type than the BSS-TXOP.

At time T2, STA B1 initiates a frame sequence 906 under a BSS TXOP 905 during the transmission of the frame sequence 904. The STA B1 sets a NAV for BSS2. In this respect, the NAV is also referred to as a BSS NAV. The STA B1 may set a NAV for BSS2 such that STA B2 may not be permitted to ignore the BSS NAV set for BSS2. The BSS NAV may not be ignored by STA B2 because STA B2 is a station of the same BSS as STA B1. During this transmission, STA B2 is excluded from acquiring another TXOP until the initiated BSS TXOP 905 ends. In this embodiment, the other stations such as STA A1 and STA A2 are not prevented to keep reusing the medium during the transmission of the frame sequence 906 at time T2 since the BSS TXOP 905 is applied to BSS2, not BSS1. In fact, the frame sequence 904 continues uninterrupted when the BSS TXOP 905 is initiated. A third set of STAs belonging to a third BSS (not shown in FIG. 9), as a secondary TXOP initiator or a secondary user of the medium, may not initiate an ALL-TXOP since the ALL-TXOP is a more restrictive TXOP type than the BSS-TXOP.

At time T3, STA B2 initiates a frame sequence 908 under a BSS TXOP 907 during the transmission of the frame sequence 904. The STA B2 sets a NAV for BSS2. In this respect, the NAV is also referred to as a BSS NAV. The STA B2 may set a NAV for BSS2 such that STA B1 may not be permitted to ignore the BSS NAV. The BSS NAV may not be ignored by STA B1 because STA B1 is a station of the same BSS as STA B2. During this transmission, STA B1 is excluded from acquiring another TXOP until the initiated BSS TXOP 907 ends. In this embodiment, the other stations such as STA A1 and STA A2 are not prevented to keep reusing the medium during the transmission of the frame sequence 906 at time T3 since the BSS TXOP 907 is applied to BSS2, not BSS1. In fact, the frame sequence 904 continues uninterrupted when the BSS TXOP 907 is initiated.

At time T4, STA A2 initiates a frame sequence 910 under a BSS TXOP 909 following the end of the frame sequence 904. The STA A2 sets a NAV for BSS1. In this respect, the NAV may be referred to as a BSS NAV. In one or more implementations, STA A2 may set a NAV for BSS1 such that STA A1 may not be permitted to ignore the NAV. The BSS NAV may not be ignored by STA A1 because STA A1 is a station of the same BSS as STA A2. During this transmission, STA A1 is excluded from acquiring another TXOP until the initiated BSS TXOP 909 ends. In this embodiment, the other stations such as STA B1 and STA B2 are not prevented of reusing the medium during the transmission of the frame sequence 910 since the BSS TXOP 903 is applied to BSS1, not BSS2. In fact, the frame sequence 908 continues uninterrupted when the BSS TXOP 909 is initiated.

The following is a listing of rules that may apply for the TXOP types:

Rule 1: An indication of the TXOP type may be presented in the PHY preamble (e.g., preamble of HE PPDU frame 600, or in the TXOP field within HE SIG-A portion of the HE preamble). In some embodiments, the indication of the TXOP type can be indicated by a reserved combination in the SIG design of the 802.11ax technologies (e.g., HE-SIG-A field 605). In other embodiments, the indication of the TXOP type can be indicated by a new field (e.g., within a MAC header of an MPDU). In one or more implementations, for the case of only BSS-TXOP, 1 bit is used to differentiate between the ALL-TXOP and the BSS-TXOP, where a logical '0' indicates the ALL-TXOP and a logical '1' indicates the BSS-TXOP.

Rule 2: A TXOP type may have an associated maximum TXOP limit. In some embodiments, the BSS-TXOP has a longer limit than the ALL-TXOP. In other embodiments, the BSS-TXOP and ALL-TXOP have equivalent limits.

Rule 3: BSS-TXOP may be a TXOP that sets the NAV only for STAs of the same BSS as the TXOP initiator.

Rule 4: BSS-TXOP may not be initiated if the NAV for the ALL-TXOP is active.

Rule 5: BSS-TXOP may have a longer TXOP-limit as compared to that of the ALL-TXOP. In one or more implementations, the ALL-TXOP limit is changed to a lower value (e.g., a limit of 1 average IP frame (approximately 1500 bytes) transmitted by MCS0, NSS=1.). In some embodiments, the TXOP limit for the BSS-TXOP can be a multiple of the ALL-TXOP limit (e.g., ten-fold).

Rule 6: There may be other types of TXOP, similar to types defined with respect to the NAV. In one or more implementations, there may be TXOPs that set the NAV based on the CCA level. For example, a station may set the NAV only if the corresponding CCA level is greater than a corresponding predetermined threshold value (e.g., −72 dbm). In other implementations, there may be a TXOP that sets the NAV based on the received power. For example, a station may set the NAV only if the station received a frame with a power greater than a corresponding predetermined threshold value.

Rule 7: Priority of TXOP types may be defined as the coverage of the NAV as well as the TXOP limit.

Rule 8: A higher priority TXOP (e.g., an ALL-TXOP) may have a lower TXOP limit than a lower priority TXOP. In some embodiments, a higher priority TXOP is not initiated in the presence of a lower priority TXOP. In other embodiments, a lower or equal priority TXOP is initiated in the presence of a higher priority TXOP. For example, in the presence of BSS-TXOP, only another BSS-TXOP (with a lower or equal priority) can be initiated, and a ALL-TXOP may not be initiated. In some embodiments, the presence of TXOP means that the NAV for that TXOP has not yet expired.

In some embodiments, a station implements multiple NAV timers per TXOP type. In other embodiments, the station may implement the TXOP type differently with only 1 NAV timer, where 1 flag can be used to indicate the priority of the existing NAV. The station that sets the timer may decide to ignore setting the NAV timer in the second case (e.g., having only 1 timer) if the NAV does not concern the station. For example, if the TXOP type is BSS-TXOP and is set by an OBSS STA, then the station may ignore the NAV for that TXOP.

In a case where a station keeps only 1 NAV timer, and there are only two TXOP types that are applicable, the following sub-rules may apply:

Sub-rule 1: A station sets the NAV timer if the received frame indicates a high priority TXOP (e.g., ALL-TXOP)

Sub-rule 2: A station sets the NAV timer if the received frame indicates a BSS-TXOP and it is set by an Intra-BSS STA (i.e., a station in the same BSS as the station that initiated the TXOP).

Sub-rule 3: A station does not modify the NAV if the received frame indicates a BSS-TXOP and the frame is sent by an OBSS STA (e.g., ignorable NAV).

In the above case scenario where only 1 NAV timer applies, no flag is needed to indicate the priority of the existing NAV.

In some embodiments, the TXOP limits (per type) may be either fixed values indicated in the 802.11 standards or BSS specific values that are included in an information element in the beacon frames or prop/association response frame exchange.

Methods to establish various TXOP types are described below.

Given the availability of various types of TXOP (e.g. availability of BSS-TXOP and ALL-TXOP), an AP or a station can establish their choice of TXOP.

As used herein, the term "BSS frames" refers to frames that carry an indication that that the frame is sent by a member of the same BSS as that of the station that processes the frame. The "BSS frames" may be referred to as "Intra-BSS frames." As used herein, the term "OBSS frames" refers to frames that carry an indication that that the frame is sent by a member of a different BSS than the BSS of STA that processes the frame. The "OBSS frames" may be referred to as "Inter-BSS frames." In some aspects, the indication carried in BSS frames and/or OBSS frames may be referred to as a Color field.

A station may initiate a BSS-TXOP if it receives OBSS frames or response frames that belong to a TXOP (e.g., ALL-TXOP) and that a number of conditions is met. In one embodiment, one set of conditions indicate that a measured received signal strength indicator (RSSI) of the frame and the response frame meet a subset or all of the following conditions: (a) the measured RSSI of the frame is less than a first predetermined threshold denoted by TH1, (b) the measured RSSI of the response frame is less than TH2, (c) the measured RSSI of the response frame is less than the measured RSSI of the frame plus a third predetermined threshold denoted by TH3.

In some embodiments, a station initiates a TXOP (e.g., ALL-TXOP) if it receives OBSS frames or response frames that belong to a BSS-TXOP and that the measured RSSI of the frame and the response frame meet certain conditions. In one embodiment, one set of conditions indicate that the measured RSSI of the frame and the response frame meet a subset or all of the following conditions: (a) the measured RSSI of the frame is less than TH1, (b) the measured RSSI of the response frame is less than TH2, (c) the measured RSSI of the response frame is less than the measured RSSI of the frame plus TH3.

In some embodiments, the OBSS frames belong to a TXOP (e.g., ALL-TXOP), where the indicator is denoted as OTO (Observed TXOP-Owners). In other embodiments, the indicator is denoted as OBTO (Observed BSS-TXOP-Owners) when the OBSS frames belong to a BSS-TXOP.

In some embodiments, HE PPDUs (e.g., 600) carry an indication in a HE SIG-A field (e.g., 605) or a HE SIG-B field (e.g., 606) and may be binary, such as the indication being set to a TRUE value (or logical '1' value) if a transmitting station has received OBSS frames, in one or more past frames or a past duration. Otherwise, the indication is set to a FALSE value (or logical '0' value). In other embodiments, the indication is non-binary. In one or more implementations, the OTO indication carries an indication of the number of OBSS TXOP-owners that initiated a TXOP (e.g., ALL-TXOP), in one or more past frames or a past duration. In one or more implementations, the OBTO indicator carries an indication of the number of OBSS TXOP-owners that initiated a BSS-TXOP, in one or more past frames or a past duration.

In some embodiments, an AP initiates a BSS-TXOP if the AP has received frames from a number of its associated stations with the OBTO indicator set to TRUE or non-zero values. Alternatively, the AP initiates a TXOP (i.e. ALL-TXOP) if the AP has received frames from a number of its associated stations with the OBTO indicator set to FALSE or zero value.

In some embodiments, a station may initiate a BSS-TXOP if the station has received BSS frames from a number of BSS stations with the OBTO indicator set to TRUE or non-zero value. Alternatively, a station may initiate a TXOP (i.e. ALL-TXOP) if the station has received frames from a number of BSS stations with OBTO indicator set to FALSE or zero value.

In some embodiments, the type of TXOP is established depending on the OBTO indication in the response frame from a responding station. In one or more implementations, a first station (e.g., STA A2 of FIG. 9) may initiate a BSS-TXOP (e.g., 909), in order to send pending frames to a second station (e.g., STA A1), if the first station has received BSS frames (e.g., 904) from the second station with OBTO indicator set to TRUE or non-zero values. In some embodiments, a station may initiate a BSS-TXOP with a control frame or a data frame, in order to send pending frames to a second station, if the station has received the response frame from the second station with the OBTO indicator set to TRUE or non-zero values. In some embodiments, the control frame transmitted under the BSS-TXOP type is an RTS frame (e.g., 502) and its response frame is a CTS frame (e.g., 506).

In some embodiments, a first station may initiate a TXOP (i.e. ALL-TXOP), in order to send pending frames to a second station, if the first station has received frames from the second station with the OBTO indicator set to FALSE or zero values. In some embodiments, a first station may initiate a TXOP with a control frame or a data frame, in order to send pending frames to a second station, if the first station has received the response frame from the second station with the OBTO indicator set to FALSE or zero values. In some embodiments, the control frame transmitted under the TXOP type is an RTS frame (e.g., 502) and its response frame is a CTS frame (e.g., 506).

In some embodiments, the type of TXOP is changed depending on the OBTO indication in the response frame. In one or more implementations, when a station has initiated a TXOP (i.e. ALL-TXOP) by sending a control frame or a data frame to a second station, and has received the response frame from the second station with the OBTO indicator set to TRUE or non-zero values, the station may convert the TXOP type from a ALL-TXOP to a BSS-TXOP in the immediately subsequent frame that would be sent to the second station.

In some embodiments, when the station has initiated a BSS-TXOP by sending a control frame or a data frame to the second station, and has received the response frame from the second station with the OBTO indicator set to FALSE or zero values, the station may convert the TXOP type from a BSS-TXOP to a ALL-TXOP in the immediately subsequent frame that would be sent to the second station.

Figure 10:
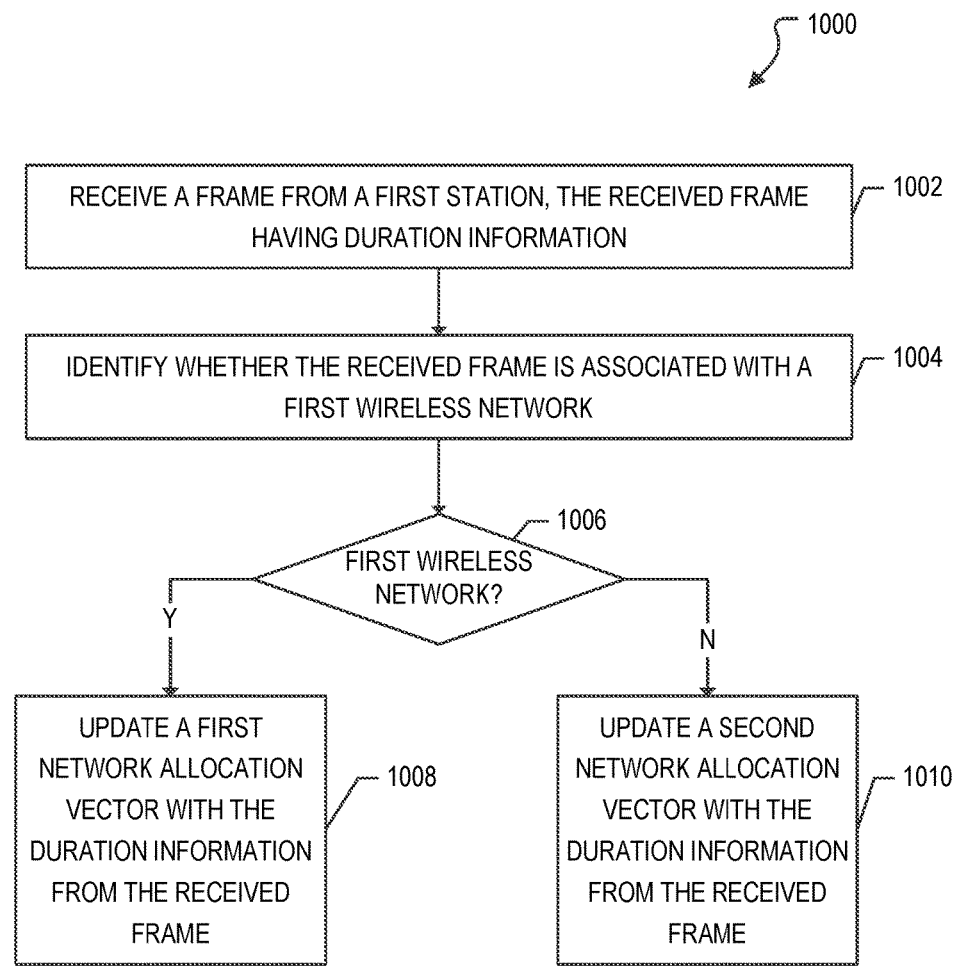
FIG. 10 illustrates a flow chart of an example of spatial reuse in a wireless network.

FIG. 10 illustrates a flow chart of an example of spatial reuse in a wireless network. For explanatory and illustration purposes, the example process 1000 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example process 1000 is not limited to the wireless communication devices 111-115 of FIG. 1 or their components, and the example process 1000 may be performed by some of the devices shown in FIG. 1, or other devices or components. Further for explanatory and illustration purposes, the blocks of the example process 1000 is described herein as occurring in serial or linearly. However, multiple blocks of the example process 1000 may occur in parallel. In addition, the blocks of the example process 1000 need not be performed in the order shown and/or one or more of the blocks/actions of the example process 1000 need not be performed. Various examples of aspects of the disclosure are described below as clauses for convenience. These are provided as examples, and do not limit the subject technology. As an example, some of the operations described below are illustrated in FIG. 10.

In step 1002, a wireless device (or station) receives a frame from a first station, in which the received frame has duration information. Next, in step 1004, the wireless device identifies whether the received frame is associated with a first wireless network or a second wireless network. In step 1006, the wireless device identifies which of the two wireless networks from which the received frame is associated. In step 1008, the wireless device may update (or set) a first NAV (or a first type of NAV) such as a BSS NAV or I_NAV for BSS stations when the received frame is determined to be associated with the first wireless network. In this respect, the received frame is an intra-BSS frame. Alternatively, in step 1010, the wireless device may update (or set) a second NAV (or a second type of NAV) such as a U_NAV or non-ignorable NAV for any station irrespective of BSS when the received frame is determined to be associated with the second wireless network. In this respect, the received frame is an inter-BSS frame.

In one or more aspects, clauses regarding the present disclosure are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wireless device for facilitating spatial reuse, the wireless device comprising:
   one or more memories; and
   one or more processors coupled to the one or more memories, the one or more processors configured to:
      process a received frame from a first station, the received frame having duration information;
      determine whether the received frame is associated with a first wireless network or a second wireless network, wherein the wireless device is associated with the first wireless network;
      determine whether a network allocation vector (NAV) included in the received frame is a first type of NAV or a second type of NAV;
      update a first network allocation vector (NAV) counter stored in the wireless device with the duration information from the received frame when the received frame is associated with the first wireless network and the NAV included in the received frame is the first type of NAV;
      update a second NAV counter stored in the wireless device with the duration information from the received frame when the received frame is associated with the first wireless network or the second wireless network and the NAV included in the received frame is the second type of NAV, wherein the second type of NAV indicates that the wireless device is not permitted to ignore the NAV included in the received frame irrespective of which wireless network is associated with the received frame; and
      ignore an update to the first NAV counter when the received frame is associated with the second wireless network and the NAV included in the received frame is the first type of NAV.

2. The wireless device of claim 1, wherein the one or more processors are further configured to:
   receive a second frame from the first station;
   determine an indication within the second frame, the indication indicating whether the first station received a third frame sent by a second station of a different wireless network than that of the first station;
   initiate a first type of transmission opportunity (TXOP) to transmit a fourth frame when the indication indicates that the first station received the third frame sent by the second station of the different wireless network; and
   initiate a second type of TXOP to transmit the fourth frame when the indication does not indicate that the first station received the third frame sent by the second station of the different wireless network.

3. The wireless device of claim 1, wherein the one or more processors are further configured to:
   determine an indication within the received frame, the indication indicating whether the received frame is associated with a first type of transmission opportunity (TXOP) or a second type of TXOP, the first type of TXOP indicating that a station of a same wireless network as that of the received frame is not permitted to ignore the received frame and a station of a different wireless network as that of the received frame is permitted to ignore one or more of the received frame or a TXOP duration that the received frame establishes, the second type of TXOP indicating that a station of a same wireless network or a different wireless network as that of the received frame is not permitted to ignore the received frame, the indication being located in a media access control (MAC) header or a physical layer (PHY) header of the received frame.

4. The wireless device of claim 3, wherein the wireless device is permitted to initiate the first type of TXOP and not permitted to initiate the second type of TXOP, when the wireless device ignores the NAV associated with one or more of the first type of NAV or the second type of NAV and a TXOP duration from the second type of TXOP.

5. The wireless device of claim 3, wherein the first type of TXOP has a duration of time that is greater than that of the second type of TXOP.

6. The wireless device of claim 3, wherein the wireless device is an access point, wherein the one or more processors are further configured to:
  determine an indication within the received frame, the indication indicating whether the first station received a second frame associated with the first type of TXOP, the second frame sent by a second station of a different wireless network than that of the first station;
  initiate the first type of TXOP to transmit a third frame when the indication indicates that the first station received the second frame associated with the first type of TXOP; and
  initiate the second type of TXOP to transmit the third frame when the indication does not indicate that the first station received the second frame associated with the first type of TXOP.

7. The wireless device of claim 1, wherein the frame is a physical layer convergence procedure (PLCP) service data unit (PSDU) of a PLCP protocol data unit (PPDU) frame, and the PSDU identifies the received frame as being associated with one of the first wireless network or the second wireless network.

8. The wireless device of claim 7, wherein the one or more processors are further configured to:
  obtain the duration information from a duration field in the PSDU.

9. The wireless device of claim 8, wherein the duration field is located in a HE SIG-A field of the PSDU.

10. The wireless device of claim 1, wherein the first wireless network is an intra-basic-service-set (intra-BSS) relative to the wireless device.

11. The wireless device of claim 1, wherein the second wireless network is an inter-basic-service-set (inter-BSS) relative to the wireless device.

12. The wireless device of claim 1, wherein the wireless device is not permitted to ignore the NAV included in the received frame when the received frame includes an indication that the first station set the first type of NAV and the second type of NAV.

13. The wireless device of claim 12, wherein the one or more processors are further configured to:
  reset the second NAV counter when the received frame is associated with the second wireless network, the second NAV counter being reset to a value relating back to a time immediately before receipt of the received frame.

14. The wireless device of claim 12, wherein the first type of NAV is associated with a first indication included in the received frame and the second type of NAV is associated with a second indication included in the received frame that is different from the first indication, the first indication indicating that the first type of NAV is ignorable by the wireless device when the received frame originates from a different wireless network and the second indication indicating that the second type of NAV is not ignorable by the wireless device irrespective of which wireless network is associated with the received frame.

15. The wireless device of claim 1, wherein the one or more processors are further configured to:
  track duration information using the first NAV counter associated with the first type of NAV and duration information using the second NAV counter associated with the second type of NAV,
  wherein the first NAV counter tracks the first type of NAV independent of the second NAV counter tracking the second type of NAV.

16. The wireless device of claim 15, wherein the one or more processors are further configured to:
  determine that a status of a communication medium associated with the wireless device is busy when the received frame is associated with the first type of NAV and the first NAV counter is not expired; and
  determining that the status of the communication medium is idle when:
    the received frame is associated with the second type of NAV independent of whether the second NAV counter expired, or
    the received frame is associated with the first type of NAV and the first NAV counter is expired.

17. The wireless device of claim 16, wherein the one or more processors are further configured to:
  update the first NAV counter with duration information from the received frame when the status of the communication medium is determined busy; and
  reset the first NAV counter to a value immediately before receipt of the received frame when the status of the communication medium is determined idle and the received frame is associated with the first wireless network.

18. A computer-implemented method of facilitating spatial reuse in one or more wireless networks, the method comprising:
  processing a received frame from a first station, the received frame having duration information, the received frame indicating that the received frame is associated with one of a plurality of transmission opportunity (TXOP) types;
  determining whether the received frame is associated with a first wireless network or a second wireless network;
  determining whether a network allocation vector (NAV) included in the received frame is associated with a first type of TXOP of the plurality of TXOP types or a second type of TXOP of the plurality of TXOP types;
  updating a first NAV counter stored in a wireless device associated with the first wireless network with the duration information from the received frame when the received frame is associated with the first wireless network and the NAV included in the received frame is associated with the first type of TXOP;
  updating a second NAV counter stored in the wireless device with the duration information from the received frame when the received frame is associated with the first wireless network or the second wireless network and the NAV included in the received frame is associated with the second type of TXOP, wherein the second type of TXOP indicates that the wireless device is not permitted to ignore the NAV included in the received frame irrespective of which wireless network is associated with the received frame; and
  ignoring an update to the first NAV counter when the received frame is associated with the second wireless network and the NAV included in the received frame is associated with the first type of TXOP.

19. The computer-implemented method of claim 18, wherein:
the received frame indicates that the received frame is associated with a first NAV type of a plurality of NAV types, the first NAV type being associated with a first constraint, the NAV included in the received frame being ignored by the wireless device associated with the first wireless network when a priority level associated with the received frame exceeds a predetermined threshold of the first constraint,
the received frame indicates that the received frame is associated with a second NAV type of the plurality of NAV types, the second NAV type being associated with a second constraint, the second NAV being ignored by the wireless device when a clear channel assessment (CCA) level for contending on a communication medium associated with the wireless device exceeds a predetermined threshold of the second constraint,
the received frame indicates that the received frame is associated with a third NAV type of the plurality of NAV types, the third NAV type being associated with a third constraint, the second NAV being ignored by the wireless device when an interference power constraint level does not exceed a predetermined threshold of the third constraint, the interference power constrain level corresponding to an amount of interference at the wireless device, and
the received frame indicates that the received frame is associated with a fourth NAV type of the plurality of NAV types, the fourth NAV type being associated with a fourth constraint, the second NAV being ignored by the wireless device when a power constraint level for a transmission by the wireless device does not exceed a predetermined threshold of the fourth constraint.

20. The computer-implemented method of claim 18, further comprising:
determining whether one or more indications in the received frame indicate that the received frame is associated with a high priority level;
determining that a wireless device associated with the first wireless network is not permitted to ignore the NAV included in the received frame when the one or more indications indicate that the received frame is associated with a high priority level and independent of whether the received frame is associated with the second wireless network; and
determining that the wireless device is permitted to ignore the NAV included in the received frame when the one or more indications indicate that the received frame is not associated with a high priority level and the received frame is associated with the second wireless network.

* * * * *